(No Model.)  2 Sheets—Sheet 1.
G. SANFORD.
MACHINE FOR OBTAINING FIBERS FROM LEAVES AND PLANTS.
No. 341,171. Patented May 4, 1886.
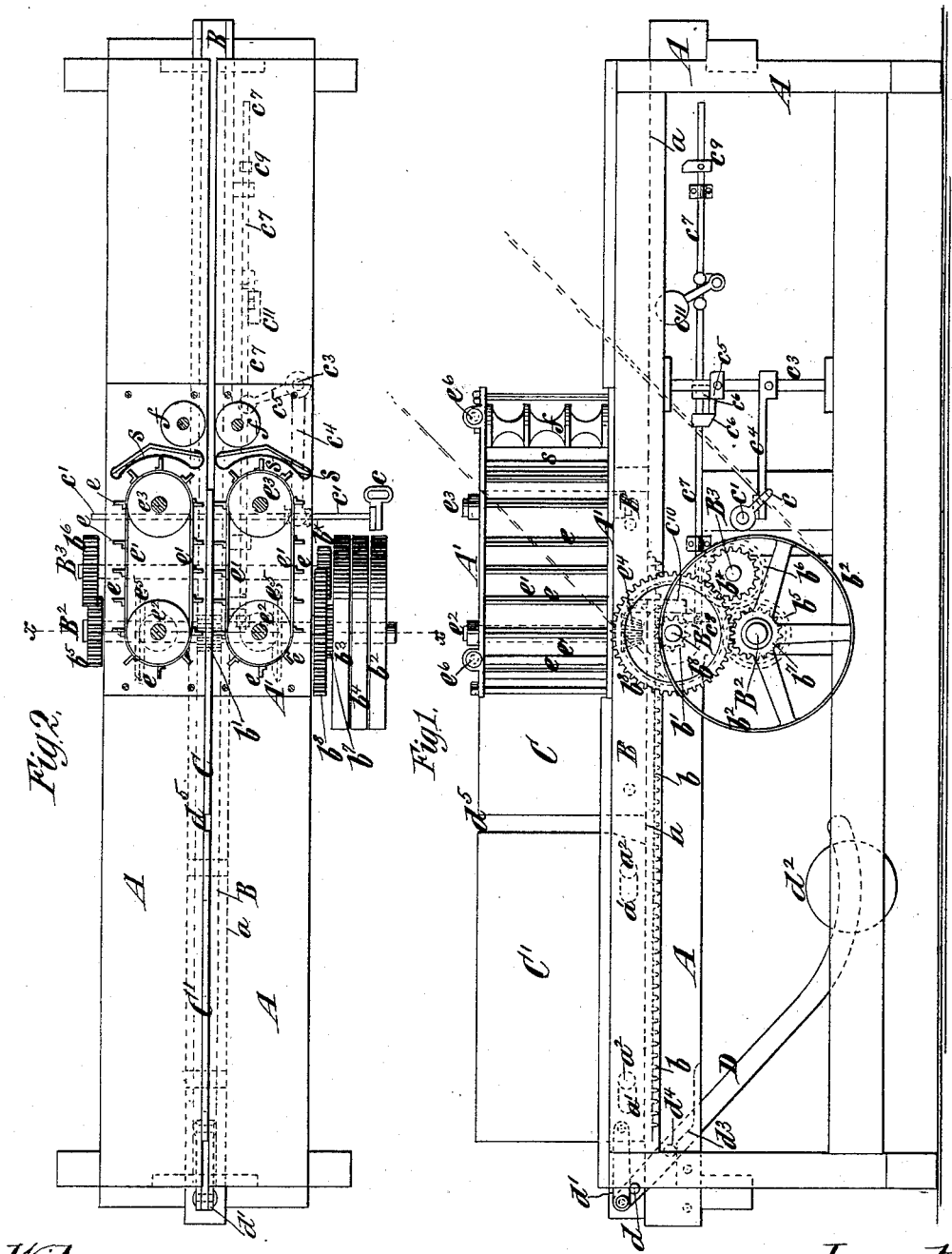

(No Model.) 2 Sheets—Sheet 2.
G. SANFORD.
MACHINE FOR OBTAINING FIBERS FROM LEAVES AND PLANTS.
No. 341,171. Patented May 4, 1886.
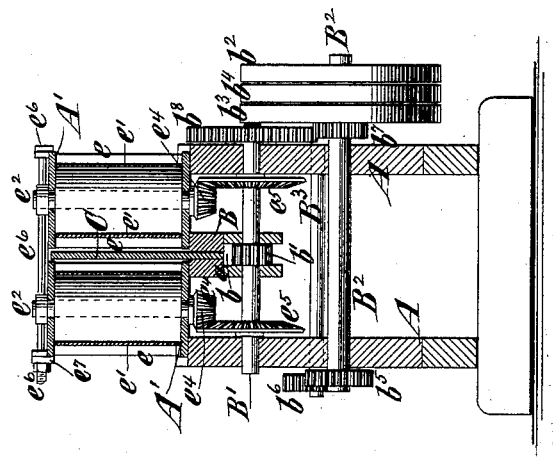
Witnesses.
Inventor.
Gelston Sanford

UNITED STATES PATENT OFFICE.

GELSTON SANFORD, OF BROOKLYN, NEW YORK.

MACHINE FOR OBTAINING FIBERS FROM LEAVES AND PLANTS.

SPECIFICATION forming part of Letters Patent No. 341,171, dated May 4, 1886.

Application filed September 25, 1885. Serial No. 178,119. (No model.)

*To all whom it may concern:*

Be it known that I, GELSTON SANFORD, of the city of Brooklyn, in the county of Kings and State of New York, have invented a new and useful Improvement in Machines for Obtaining Fibers from Leaves and Plants, of which the following is a specification.

My invention is applicable to machines for operating upon the leaves of the agaves or other fiber-producing plants while in a green state, and also to machines for cleaning or scutching bark fibers, such as flax, hemp, jute, ramie, &c.

Many machines for the above purposes have comprised a clamp, whereby the leaf is held at one end while one side is operated upon by an endless chain of scrapers, after which the leaf is released from the clamp, changed side for side, again clamped, and the other side operated on. Not only is the leaf or fiber liable to be pulled out of the clamp and more or less injured, but time is lost, because the attendant must release and again clamp the leaf after one side is scraped or cleaned.

My improved machine comprises two endless chains or series of scrapers arranged side by side to travel in upright planes, and a plate arranged vertically and having a reciprocating movement in a path between the two series of scrapers. The vertically-arranged plate comprises two sections arranged in line, and one of which has a longitudinal movement away from and toward the fixed section, so as to form between them a gap sufficient to receive the middle portion of the leaf, and to then close on the middle portion of the leaf and grasp it fast. The aforesaid plate is carried by a horizontally-moving slide, which is or may be provided with a rack, and by a pinion and suitable reversing mechanism the slide and the gripping-plate will be traversed to and fro. As the leaf is carried between the two series of scrapers its two end portions lap backward against the gripping-plate, and the latter forms a base or support, on which the portions of the leaf are sustained while under the action of the scrapers. As the end portions of the leaf on both sides of the gripping-plate are simultaneously scraped, there is no tendency to pull the leaf away from the clamp which holds it. Beyond the series of scrapers are rollers having vertical axes and arranged on opposite sides of and close to the reciprocating plate. After the leaf has been carried once between the series of scrapers the direction of travel of the gripping-plate is reversed and the leaf is turned backward, or the other side out, and the side which before lay in contact with the plate is now scraped. The aforesaid rollers hold the long fibers from falling down when the direction of travel of the gripping-plate and leaf is reversed.

The invention consists in novel combinations of parts hereinafter described, and pointed out in the claims.

I may also employ, either with or without the aforesaid rollers, concave beds or guards, in close proximity to which the scrapers pass as they are carried around their supporting-rollers, and by which the slack portion of the leaf which results from the change in direction of movement of the parts will be taken up and the leaf prevented from falling while being reversed in position.

In the accompanying drawings, Figure 1 is a vertical longitudinal section of a machine embodying my invention. Fig. 2 is a plan thereof, a portion of the top of the frame being removed. Fig. 3 is a transverse vertical section on the plane of the dotted line $x\,x$, Fig. 1.

Similar letters of reference designate corresponding parts in all the figures.

A designates the main framing of the machine, which may be of wood or metal and of any suitable form. At the center thereof is a longitudinal slideway, $a$, to which is fitted a long slide or beam, B. Extending along this slide, and projecting upward from the top thereof, is a metal plate composed of two sections, C C', arranged in line with each other and end to end. This plate is of little thickness, and one portion, C, is fixed to the slide B, while the other portion, C', is movable slightly endwise toward and from the portion C.

As here shown, the plate portion C' is provided with slots $a'$, through which pass bolts or rivets $a^2$, and in this way provision is afforded for the lengthwise movement of the plate portion C'.

Upon the under side of the slide or beam B is a rack, $b$, with which engages a pinion, $b'$, on a cross-shaft, B'. A main shaft, B², extends parallel with the shaft B'. Any suitable reversing mechanism similar to that used in a planer may be employed for imparting a rotary motion alternately in reverse directions to the shaft B'.

As here shown, the shaft B² has upon it two pulleys, $b^2$ $b^3$, and an intermediate pulley, $b^4$. The pulley $b^2$ is fast on the shaft B², and on the shaft is a pinion, $b^5$, which gears into a spur-wheel, $b^6$, on an intermediate shaft, B³. The intermediate shaft, B³, also carries a pinion, $b^*$, which gears into a wheel, $b^8$, on the shaft B'. The pulley $b^4$ is a simple loose pulley, and the pulley $b^3$ is loose on the shaft, but has fast upon it a pinion, $b^7$, which also engages with the wheel $b^8$. With this system of pulleys is to be used a single driving-belt controlled by a shipper, $c$, and it will be understood that when the belt is on the pulley $b^2$ or $b^3$ motion will be imparted to the shaft B' and slide B in one or other direction, while the shifting of the belt onto the pulley $b^4$ will altogether stop the machine.

The belt-shipper $c$ is on a bar, $c'$, which may be slid transversely of the machine, and is operated by a rock-shaft, $c^3$, provided with arms $c^4$ $c^5$. The arm $c^4$ is connected with the bar $c'$, and the arm $c^5$ is engaged by lugs $c^6$ on a shipper-rod, $c^7$. On the rod $c^7$ are toes $c^8$ $c^9$, and on the slide B is an arm or bracket, $c^{10}$, which, at the extremes of movement of the slide, comes in contact with the toes $c^8$ $c^9$, and through the mechanism above described shifts the belt.

The above action of the slide will shift the belt in either direction onto the loose pulley $b^4$, and the shifting of the belt will be completed by a lever and weight, $c^{11}$, applied to the rod $c^7$, as shown in Fig. 1.

The slide B carries a lever, D, fulcrumed at $d$, and connected by a rod, $d'$, with the movable plate portion C', and is actuated by a weight, $d^2$, to move the plate portion C' toward and hold it with a gripping action against the plate portion C. Instead of this weight $d^2$, an equivalent spring may be used.

Near the feeding end of the frame is a stationary cam, $d^3$, and on the lever D is a roller or pin, $d^4$, projecting in the path of this cam. When the slide B moves back to the position shown in Fig. 1, the lever D is carried against the cam $d^3$, and the plate portion C' is moved so as to open between it and the portion C a gap, $d^5$, in which a leaf may be placed, with its middle portion in the gap. As soon as the slide B commences its return movement the lever D is relieved of the action of the cam, and the weight $d^2$ moves the plate portion C' toward the portion C and grips the leaf between them.

Upon opposite sides of the path of travel of the plate C C' are series of scrapers $e$, which are carried by endless belts $e'$, or by chains, and are supported and driven by drums or wheels on upright shafts $e^2$ $e^3$. The shafts $e^2$ have at their lower ends bevel-pinions $e^4$, which gear into and receive motion from the bevel-wheels $e^5$ on the shaft B'. The shafts $e^2$ $e^3$ are journaled in supplemental frames A', mounted on the main frame A. These supplemental frames A' are held together by bolts $e^6$, to which rubber cushions $e^7$, or other springs, are applied, and which cause the scrapers $e$ to exert a yielding action on the materials and provide for their slight adjustment toward and away from the plate C C'. The supplemental frames A' also support rollers $f$ on opposite sides of and bearing against the plate C C'. These rollers are grooved, or have narrow circumferential bearing-surfaces, and prevent the leaves or fiber from dropping down as they leave the scrapers after movement past them in one direction.

In the operation of my machine the leaves are placed in the gap $d^5$, and are grasped at the middle of their length as the slide B and gripping-plate move forward. The end portions of the leaf lap or fold back on opposite sides of the plate, and are by the moving scrapers scraped clean on one side. After the leaf passes the scrapers the direction of movement is reversed, and the portions of the leaf are folded or lap backward on the other side of the gap $d^5$, thus bringing outermost their surfaces which were before against the plate. The movement of the scrapers is at the same time reversed, and they then scrape the opposite faces of the leaf and complete the operation.

In order to facilitate the reversing of the leaf when the direction of movement of the gripping-plate and scrapers is changed, I may employ concave beds, in close proximity with which the scrapers pass as they are carried around their shafts $e^3$, and by which the slack in the leaf will be taken up and the leaf reversed in position and prevented from falling. I have shown such concave beds or shields at $s$. They may be elastic and made of sheet metal bent into curved form and arranged concentric with the shafts $e^3$. As soon as the direction of movement of the gripping-plate and scrapers is reversed the free ends of the leaf will be carried round inside the concave beds $s$ by the scrapers, and the leaf will be sustained and reversed in position. These concave beds $s$ may be used with or without the rollers $f$.

What I claim as my invention, and desire to secure by Letters Patent, is—

1. The combination, with two series of scrapers, of a slide having projecting from it a plate composed of two portions arranged in line, and one of which is movable toward and from the other to clamp and release the material, and reversible driving mechanism for reciprocating said slide and plate between the series of scrapers, substantially as herein described.

2. The combination, with a reciprocating slide provided with an upwardly-projecting plate composed of two portions which are in line, and one of which is movable lengthwise relatively to the other, of a weight or equivalent spring for moving the plate portion to close the gap between them, a lever and cam for moving the plate portion to open said gap, reversible driving mechanism for reciprocating the slide and plate, and two series of scrapers, between which the plate passes, substantially as herein described.

3. The combination, with the slide and fixed and movable plate portions C C', of the weighted lever D, carried by the slide and connected with the movable plate portion, the stationary cam for actuating said lever to open the gap between the plate portions, reversible driving mechanism for reciprocating the slide, and series of scrapers, between which said plate portions pass, substantially as herein described.

4. The combination, with the slide and the gripping-plate carried thereby, of reversible driving mechanism for reciprocating the slide, two series of scrapers, between which the plate passes, and rollers on opposite sides of the path of the plate, to prevent the fiber from falling after moving beyond the scrapers, substantially as herein described.

5. The combination, with the slide and its gripping-plate, of reversible driving mechanism for reciprocating the slide, two series of scrapers, between which the plate passes, and yielding connections between the two series of scrapers, whereby they are caused to exert a yielding pressure on the materials subjected to them, substantially as herein described.

6. The combination, with the slide and its gripping-plate, of two series of scrapers, between which the plate passes, reversible driving mechanism for the slide and scrapers, and concave beds or shields in proximity to the scrapers as they pass around their shafts, and by which the leaf is reversed in position, substantially as herein described.

GELSTON SANFORD.

Witnesses:
C. HALL,
FREDK. HAYNES.